(12) United States Patent
Dowling et al.

(10) Patent No.: US 7,221,520 B2
(45) Date of Patent: May 22, 2007

(54) CAMERA CONTROL USING WIRELESS TECHNOLOGY

(75) Inventors: Martin J. Dowling, Plymouth, PA (US); Scott H. Lushbough, Ardmore, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 175 days.

(21) Appl. No.: 10/984,492

(22) Filed: Nov. 9, 2004

(65) Prior Publication Data

US 2005/0130584 A1 Jun. 16, 2005

Related U.S. Application Data

(60) Provisional application No. 60/519,492, filed on Nov. 13, 2003.

(51) Int. Cl.
*G02B 15/14* (2006.01)

(52) U.S. Cl. .......................... 359/698; 455/73

(58) Field of Classification Search ................ 359/398; 370/310, 328; 455/67.11, 73
See application file for complete search history.

(56) References Cited

U.S. PATENT DOCUMENTS 6,052,509 A * 4/2000 Abe ........................... 386/117
2005/0096084 A1* 5/2005 Pohja et al. .............. 455/556.1

FOREIGN PATENT DOCUMENTS

WO 2004/089021 A2 10/2004

* cited by examiner

*Primary Examiner*—Timothy Thompson
*Assistant Examiner*—Jerry Fang
(74) *Attorney, Agent, or Firm*—Volpe and Koenig, P.C.

(57) ABSTRACT

A video connection is established using cameras which are able to be remotely controlled by a distant viewer. A local radio link is established between a telephony device such as a cellular telephone or other wireless transmit/receive unit (WTRU). A distant viewer connected through a telephone link can use a video image screen to view the camera image and can use the telephone link to control the operation of the camera.

20 Claims, 2 Drawing Sheets

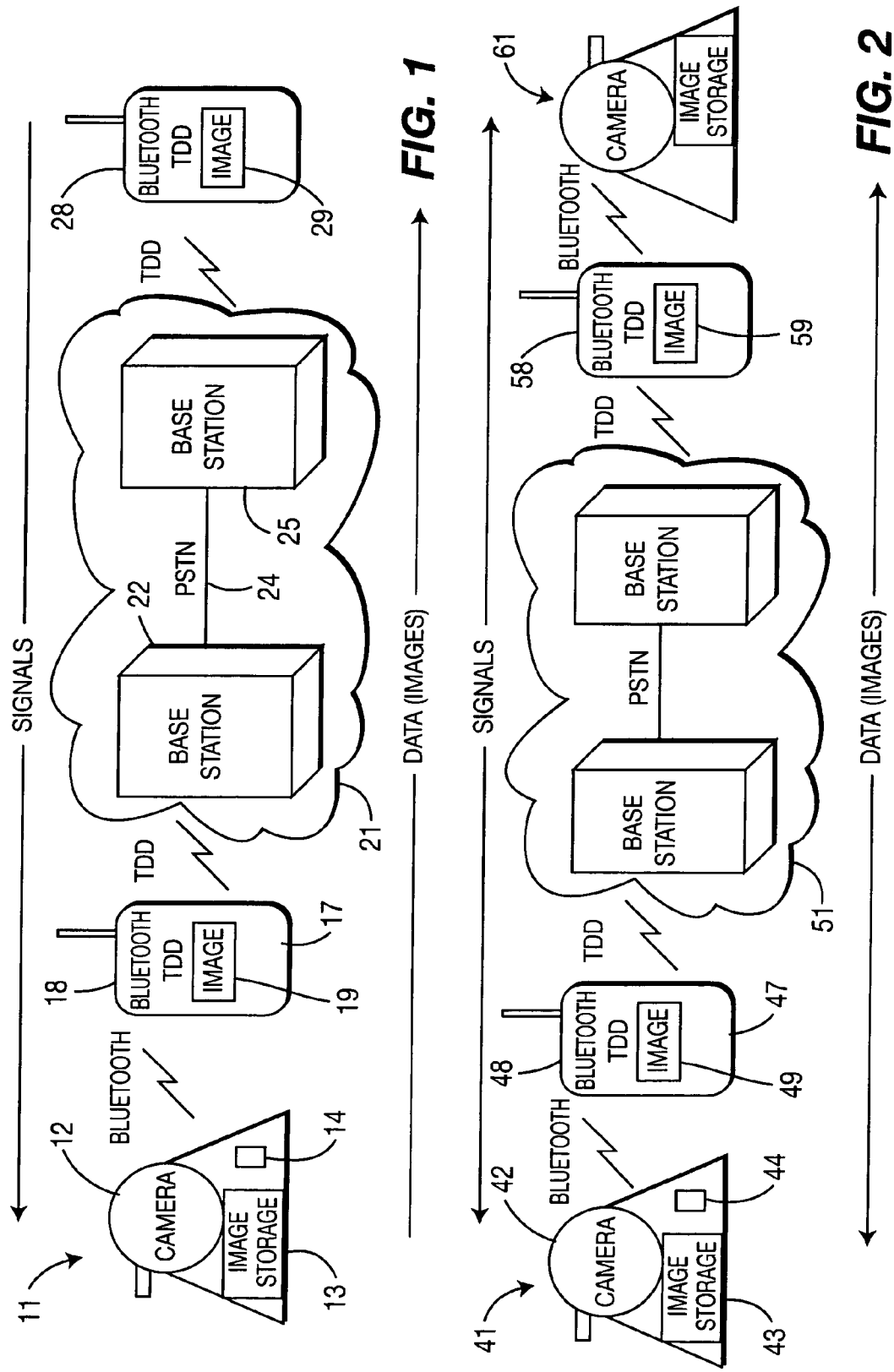

CAMERA CONTROL USING WIRELESS TECHNOLOGY

CROSS REFERENCE TO RELATED APPLICATION

This application claims the benefit of U.S. Provisional Application No. 60/519,492 filed Nov. 13, 2003, which is incorporated by reference as if fully set forth.

FIELD OF INVENTION

The present invention relates to video display communication, including multimedia wireless communication and control.

BACKGROUND

There generally exist two technologies that are used to communicate real-time images over the public or private phone systems.

One technology uses fixed cameras and monitors. This includes video-conferencing and web cameras attached to a personal computer. This tends to be a complicated and expensive solution to the problem of communicating video or real time, rapid-sequence still images. The solution works well if the subject is within the range of camera and monitor, since both the camera and monitor provide a good picture. However, the equipment is not portable. Since the equipment is relatively immobile and it is impractical for the video equipment to be moved from site to site on a frequent basis, the user must come to the location of the video equipment.

Another technology includes PDAs and cell phones with built-in cameras. Since it is commonplace for people to carry their cell phones with them, the camera can be turned on at a moment's notice and used to take and transmit an image or video. However, the gain in portability results in a loss in quality and control. The cameras in personal communication devices (PCDs) are small and inexpensive, and do not produce an image comparable in quality to fixed systems. Furthermore, the image is difficult to control. The cameras are generally fixed in position in the PCD and are aimed according to the handhold position of the PCD. If the subject wishes to show an image of their surroundings to the person with whom they are communicating, they must aim the PDA away from themselves, thus making it difficult to show scenes and talk into the phone at the same time. Additionally, since the speaker is holding the phone, the image will be jittery. The speaker not be able to precisely aim the camera, and the person with which the speaker is communicating will not be able to control the aim of the camera.

Two examples will illustrate the benefit of the invention:

Consider the case of a non-structured event (e.g., a child's birthday party) that a distant user (e.g., the child's grandparent) wishes to participate in or at least observe. It would be impractical to videoconference or web-conference the event because of its informal or non-structured nature. The distant user may not have the video equipment or the technical skill to set up such a system. Even if the distant user had the capability, it would be difficult for the people at the event to set up and manage the video, as this would involve moving camera, monitor, cables and possibly computer and control box.

The situation would be equally problematic using a personal communication device (PCD). It would be easy enough to place a call presuming both ends of the connection had camera cell phones or equivalent devices. If the call were made, it would be difficult to aim the built-in camera, and it would be nearly impossible for the remote user to adjust the camera in any meaningful way.

Similar circumstances exist in business and technology, for example in cases where a conventional videoconferencing arrangement is unavailable. In the case of field engineering, it would be desirable to permit rapid setup of an external video link and permit the video device to be externally controlled.

It would be desirable to combine the image quality and control inherent in fixed camera systems with the portability and spontaneity of a camera-capable PCD.

SUMMARY

According to the present invention, a system enables a user to control a remote camera using wireless communication links. A controllable camera is connected to a wireless transmit/receive unit (WTRU) via a transceiver over a local non-subscriber communication connection. The WTRU receives images from the camera, and transmits control signals to, a camera control apparatus, and establishes a radio link to communicate with a remote terminal. The remote terminal is then able to control the camera through the WTRU and receive images from the camera through the WTRU.

BRIEF DESCRIPTION OF THE DRAWINGS

FIG. 1 is a schematic block diagram showing a one-way transmission of images through a two-way link.

FIG. 2 is a schematic block diagram showing two-way transmission of images through a two-way link.

DETAILED DESCRIPTION OF THE PREFERRED EMBODIMENTS

Figure 3:
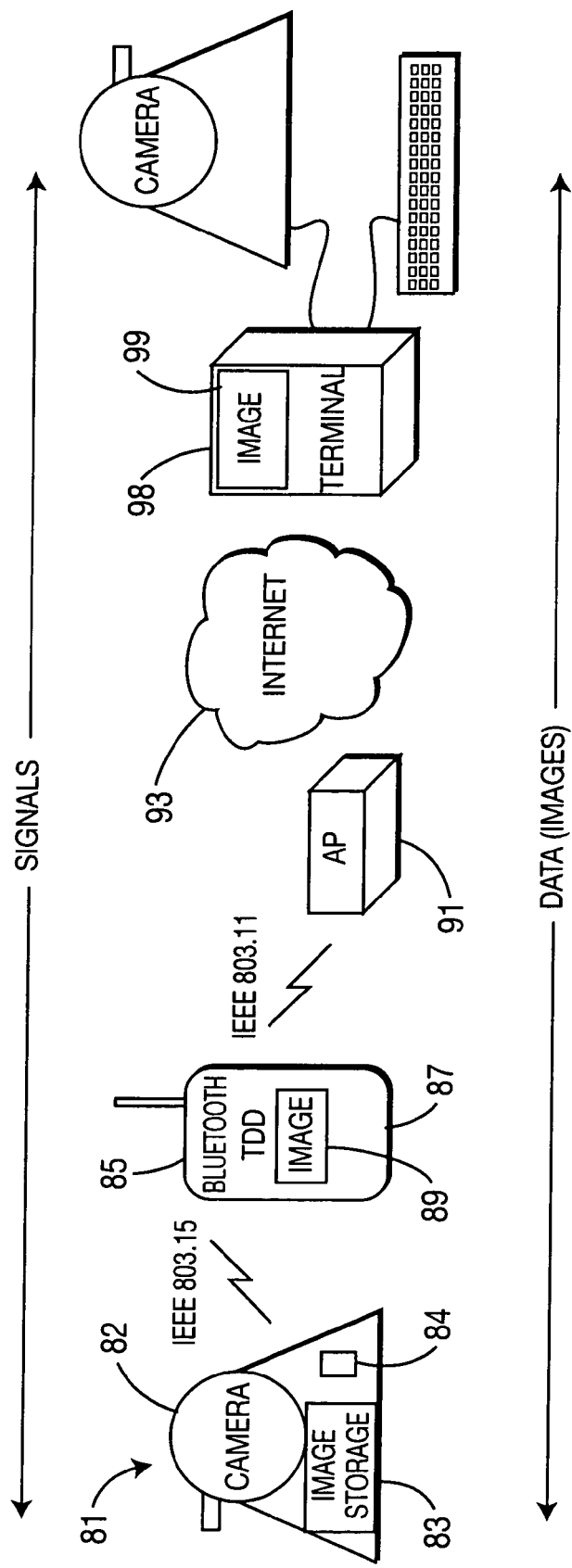
FIG. 3 is a schematic block diagram showing a link implemented through wireless access points (APs).

According to the present invention, a portable, stand-alone, wireless camera is controllable both locally and remotely through a personal communication device (PCD) such as a cell phone or other wireless transmit/receive unit (WTRU). A WTRU includes but is not limited to user equipment, mobile station, fixed or mobile subscriber unit, pager, personal communication device (PCD) or any other type of device capable of operating in a wireless environment. An "access point" (AP) is a station or device which provides a wireless access for devices to establish a wireless connection with a LAN, and establishes a part of a wireless LAN (WLAN). If the AP is a fixed device on a WLAN, the AP is a station which transmits and receives data. The AP permits connection of a WTRU to a network, provided that the WLAN itself has a connection to the network. When referred to hereafter, a base station includes but is not limited to a Node-B, site controller, access point or any other type of interfacing device in a wireless environment. Wireless environments include, but are not limited to, wireless local area networks (WLANs) and public land mobile networks. The images may be transmitted through the local WTRU. In one configuration, the camera is also able to store images. Thus the portable camera with image storage device and transceiver is used to transmit images, with control functions received remotely from a telecommunications connection. The user links the image transmissions with a telecommunications link so that once the phone connection is established, a wireless link is activated between the local phone and the camera/storage/transceiver device.

In one configuration, the phone at the transmission location is provided as a cellular or "portable" phone. In alternate embodiments, the phone at the transmission location is provided as a landline phone or an internet telecommunications connection. In each case, a wireless link is provided between the local phone and the camera/storage/transceiver (CST) device. In the preferred embodiment, the CST device includes a digital camera, an image storage device and a transceiver.

The wireless link provided between the local phone and the camera/storage/transceiver (CST) device can be of one of a variety of wireless links, such as 802.11, 802.15, BlueTooth, 3G, or 2G as examples. Once the link is established, the distant user is able to receive the image via the local phone, and furthermore can control the camera by means of a protocol such as H.323, which allows signaling to adjust pan, tilt, and zoom.

In one particular configuration, remote control of the camera can be achieved by the distant WTRU by pre-existing controls. These can be either menu controls, provided that the WTRU has a capability of transmitting the menu controls, or other controls such as a telephone keypad.

FIG. 1 is a schematic block diagram showing a one-way transmission of images through a two-way link. A camera device 11 includes a camera with associated image processor 12, an image storage device 13 and a transceiver 14. The camera device 11 communicates through a WTRU 17, which includes a BlueTooth transceiver 18 and video monitor screen 19 which, in turn, communicates with cellular network 21. The cellular network 21 may include one or more base stations 22, connections to a public switched telephone network (PSTN) 24 and connections to a remote network comprising one or more base stations 25. It is understood that connections at either end may be made directly through the PSTN 24 or through wireless connections.

The BlueTooth transceiver is a local communication device which provides a way to connect and exchange information between devices like personal digital assistants (PDAs), mobile phones, laptops, PCs, printers and digital cameras via a secure, low-cost, globally available short range radio frequency, and may implement an IEEE 802 series protocol such as the IEEE 802.15 protocol. In one implementation, BlueTooth lets these devices talk to each other when they come in range, even if they are not in the same room, as long as they are within 10 meters of each other). Other wireless technologies used to establish short range communication between devices can be used in place of BlueTooth. BlueTooth communication and similar communication is typically implemented as a non-subscriber communication connection.

The cellular network 21 connects with a distant WTRU 28, which provides an image through display 29. The distant WTRU 28 is able to control the camera device 11 through the communications link established by the camera device 11, WTRU 17, network 21 and WTRU 28.

WTRU 17 also has the video functions for controlling the camera device locally. Thus both the local and distant WTRUs 17, 29 are able to control camera device 11.

FIG. 2 is a schematic block diagram showing two-way transmission of images through a two-way link. A first camera device 41 includes a camera with associated image processor 42, an image storage device 43 and a transceiver 44. The camera device 41 communicates through a WTRU 47, which includes a BlueTooth transceiver 48 and a video display 49. WTRU 47 in turn communicates with cellular network 51. The cellular network 51 connects with a distant WTRU 58, which provides an image through display 59. The distant WTRU 58 is able to control the camera device 41 through the communications link established by the camera device 41, WTRU 47, network 51 and WTRU 58. WTRU 58 also communicates with a second camera device 61. This permits WTRU 58 to provide an image of the second camera device 61 to WTRU 48 and allows WTRU 48 to control the second camera device 61 through the communications link established by WTRU 48, network 51, WTRU 68 and the second camera device 61.

EXAMPLE 1

A camera device is placed in a room, such as on a table, counter, or shelf. A participant dials a distant user, and once the phone connection is established, activates a wireless link between the local phone and the camera/storage/transceiver device. A wireless link between the local phone and the CST device is established, and the distant user is able to receive the image via his or her local phone, and furthermore can control the camera. The configuration for this is shown in FIG. 1.

Because the camera does not have to be embedded in the phone, it can have higher resolution optics, and a bigger, sharper, adjustable lens. Since the camera has a built in storage device, the distant user could command the camera to "snap" a picture, which could be saved on a flash memory card, for example. After the event, such as a party, the stored images could be transmitted in finer detail than may be available for real-time viewing. The local user can then use the flash memory card for printing.

EXAMPLE 2

As a second example, consider two closely related but geographically distant families who wish to communicate with each other at a holiday meal. The CSTs could be placed in the dining room in each house and a phone call established between the homes. Each family would see the other family on its cell phone and would be able to adjust the remote camera in terms of azimuth angle, elevation angle, pan and zoom so that as family members take turns speaking around the table, the remote user could focus the camera on the current speaker. This situation is shown in FIG. 2.

These two examples show the advantages of the present invention over the state-of-the-art, in which video conferencing is too stationary, clumsy, and expensive for informal home use. Typical cameras built into PDAs and cell phones are too low in quality and controllability to provide acceptable performance this problem can be solved by enabling the standalone CST device, and the viewer-controller-transceiver PCD to be wireless and portable.

FIG. 3 is a schematic block diagram showing a link implemented through wireless access points (APs). A first camera device 81 includes a camera with associated image processor 82, an image storage device 83 and a transceiver 84. The camera device 81 communicates through a WTRU 87, which includes a BlueTooth transceiver 85 and a video display 89. WTRU 87 in turn communicates with a WLAN 91 which connects through an Internet or similar connection 93. The Internet connection provides connectivity with a distant terminal 98, which provides an image through display 99. The distant terminal 98 is able to control the camera device 81 through the communications link established by the camera device 81, WTRU 87, WLAN 91, Internet connection 93 and terminal 98. It is further possible for WTRU 87 to control and receive images from a camera associated with the terminal 98.

While physically separate camera devices 11, 41, 61, 81 and WTRUs or terminals 17, 47, 58, 87, 98 are described, it is possible to integrate the camera device with the WTRU. This would make it more difficult to use the WTRU in some instances, but would eliminate the need to separately communicate between the WTRU and the camera.

What is claimed is:

1. A video control system for enabling a user to control a remote camera using wireless communication links, comprising: a camera device comprising a camera, a camera control apparatus and a transceiver; a first personal communication device that receives images from, and transmits control signals to, said camera control apparatus; a local non-subscriber communication radio link from said first personal communication device to said camera device; and a link to a communication device remote from the first personal communication device.

2. The system of claim 1, comprising the link to the communication device remote from the first personal communication device provided as a wireless network communications link to a second personal communication device.

3. The system of claim 2 wherein the link to the second personal communication device is configured to permit the first personal communication device to relay control commands from the second personal communications device to said camera device and to relay images from said camera device to the second personal communications device.

4. The system of claim 3, wherein the link to the camera device includes a local connection configured to substantially implement an IEEE 802 series protocol, the local connection is configured as a direct link to the camera device and to provide a link between the camera device and a further network connection.

5. The system of claim 3, wherein the camera device additionally comprises an image storage device.

6. The system of claim 1, wherein the transceiver is configured to receive wireless remote control instructions.

7. The system of claim 1, wherein the camera control apparatus is configured to provide directional movement control of the camera.

8. The system of claim 7, wherein the camera control apparatus includes a positioning apparatus and a lens adjustment.

9. A wireless transmit/receiving unit (WTRU) capable of providing a user at a remote site with an ability to retrieve images over a communication link and to control the images, the WTRU comprising: a local non-subscriber connection to a camera device comprising a camera and a camera control apparatus; and a transceiver capable of establishing a radio link and communicating through a shared communication system to the remote site, said communication including transmitting images from the camera and receiving camera control instructions from the remote site.

10. The WTRU of claim 9, wherein the wireless link to the camera device includes a local connection configured to substantially implement an IEEE 802 series protocol.

11. The WTRU of claim 9, wherein the camera device additionally comprises an image storage device.

12. The WTRU of claim 9, wherein the transceiver is configured to relay control commands from the remote site to said camera device and relay images from said camera device to the remote site.

13. The WTRU of claim 12, wherein the camera control apparatus provides directional movement control of the camera and the transceiver is configured to relay directional movement control commands.

14. The WTRU of claim 13, wherein the camera control apparatus includes a positioning apparatus and a lens adjustment and the transceiver is configured to relay positioning apparatus and a lens adjustment control commands.

15. The WTRU of claim 9, wherein the camera control apparatus provides directional movement control of the camera and the transceiver is configured to receive directional movement control commands.

16. The WTRU of claim 13, wherein the camera control apparatus includes a positioning apparatus and a lens adjustment and the transceiver is configured to receive positioning apparatus and a lens adjustment control commands.

17. The WTRU of claim 9, wherein the transceiver is configured to receive wireless remote control instructions.

18. A method for controlling a remote camera using wireless communication links, comprising: providing a camera device including a camera, a camera control apparatus and a local non-subscriber connection with a first wireless transmit/receive unit (WTRU), so that the WTRU receives images from, and transmits control signals to, said camera control apparatus; establishing a radio link with said WTRU on a wireless communication network, and providing control to said camera device in response to signals received through the wireless communication network and transmitting images from said camera device through the wireless communication network.

19. The method of claim 18, comprising:
providing a wireless transmit/receive unit (WTRU) and a remote link from the WTRU through a shared subscriber network to the camera device to establish a further wireless network communications link to provide said control; and
relaying control commands through the link from the WTRU to said camera device and relay images from said camera device to the WTRU.

20. The method of claim 19, comprising establishing the link to the camera device including establishing a local connection substantially implementing an IEEE 802 series protocol.

* * * * *

UNITED STATES PATENT AND TRADEMARK OFFICE
CERTIFICATE OF CORRECTION

PATENT NO. : 7,221,520 B2
APPLICATION NO. : 10/984492
DATED : May 22, 2007
INVENTOR(S) : Dowling et al.

It is certified that error appears in the above-identified patent and that said Letters Patent is hereby corrected as shown below:

On the title page, item (75), Inventors:, page 1, left column, line 1, after the word "Plymouth", insert --Meeting--.

At column 1, line 46, after the words "aim the", delete "PDA" and insert therefor --PCD--.

At column 1, line 50, after the word "speaker", insert --may--.

At column 1, line 51, after the words "person with", delete "which" and insert therefor --whom--.

At column 3, line 48, before the word "Other", delete "other)." and insert therefor --other.--.

At column 4, line 51, after the word "performance", delete "this" and insert therefor --. This--.

Delete claim 1, column 5, lines 10-19, and insert therefor --1. A video control system for enabling a user to control a remote camera using wireless communication links comprising:

a camera device comprising a camera, a camera control apparatus and a transceiver;

a first personal communication device configured to receive images from, and to transmit control signals to, said camera device;

a local non-subscriber communication radio link from said first personal communication device to said camera device; and a link to a communication device remote from the first personal communication device.--.

Delete claim 9, column 5, lines 46-55, and insert therefor --9. A wireless transmit/receive unit (WTRU) for providing a user at a remote site with an ability to retrieve images over a communication link and to control the images, the WTRU comprising:

a local non-subscribing connection to a camera device comprising a camera and a camera control apparatus; and a transceiver configured to establish a radio link through a shared communication system to the remote site to transmit images from the camera and to receive camera control instructions from the remote site.--.

Delete claim 10, column 6, lines 1-3, and insert therefor --10. The WTRU of claim 9, wherein the wireless link to the camera device includes a local connection configured to substantially implement an IEEE 802 series protocol.--.

Delete claim 18, column 6, lines 29-40 and insert therefor --18. A method for controlling a remote camera using wireless communication links, comprising:

providing a camera device including a camera, a camera control apparatus and a local non-subscriber connection with a first wireless transmit/receive unit (WTRU), so that the WTRU receives images from, and transmits control signals to, said camera device;

establishing a radio link with said WTRU on a wireless communication network; and providing control to said camera device in response to signals received through the wireless communication network and transmitting images from said camera device through the wireless communication network.--.

Signed and Sealed this

Twenty-third Day of March, 2010

David J. Kappos
*Director of the United States Patent and Trademark Office*